United States Patent
MacDougall et al.

(10) Patent No.: US 8,864,374 B2
(45) Date of Patent: Oct. 21, 2014

(54) LOW PROFILE, HIGH TEMPERATURE, HYDROGEN TOLERANT OPTICAL SENSING CABLE

(75) Inventors: Trevor Wayne MacDougall, Simsbury, CT (US); Paul Eric Sanders, Madison, CT (US)

(73) Assignee: Qorex LLC, Rocky Hill, CT (US)

( * ) Notice: Subject to any disclaimer, the term of this patent is extended or adjusted under 35 U.S.C. 154(b) by 128 days.

(21) Appl. No.: 13/209,000

(22) Filed: Aug. 12, 2011

(65) Prior Publication Data

US 2012/0039359 A1    Feb. 16, 2012

Related U.S. Application Data

(60) Provisional application No. 61/373,442, filed on Aug. 13, 2010, provisional application No. 61/373,349, filed on Aug. 13, 2010, provisional application No. 61/373,364, filed on Aug. 13, 2010, provisional application No. 61/373,394, filed on Aug. 13, 2010.

(51) Int. Cl.
*G01K 11/00* (2006.01)
*G01K 11/32* (2006.01)
*G02B 6/44* (2006.01)

(52) U.S. Cl.
CPC .......... *G01K 11/32* (2013.01); *G01K 2011/324* (2013.01); *G02B 6/4492* (2013.01)
USPC .............. 374/161; 374/E11.016; 73/152.02

(58) Field of Classification Search
USPC ....................................................... 385/12
See application file for complete search history.

(56) References Cited

U.S. PATENT DOCUMENTS

| | | | | |
|---|---|---|---|---|
| 5,422,478 | A * | 6/1995 | Wlodarczyk et al. | 250/227.21 |
| 5,729,005 | A * | 3/1998 | MacDougall et al. | 250/227.17 |
| 5,736,737 | A * | 4/1998 | Dawson et al. | 250/227.17 |
| 6,237,421 | B1 * | 5/2001 | Li et al. | 73/800 |
| 6,278,816 | B1 * | 8/2001 | Keur et al. | 385/29 |
| 6,365,891 | B1 * | 4/2002 | Hodgson et al. | 250/227.14 |
| 6,416,234 | B1 * | 7/2002 | Wach et al. | 385/70 |
| 6,490,931 | B1 * | 12/2002 | Fernald et al. | 73/705 |
| 6,810,175 | B1 * | 10/2004 | Wey et al. | 385/28 |
| 6,877,378 | B2 * | 4/2005 | Bailey et al. | 73/705 |
| 6,996,316 | B2 * | 2/2006 | Bailey et al. | 385/123 |
| 7,021,388 | B2 * | 4/2006 | Williams | 166/372 |

(Continued)

*Primary Examiner* — Lisa Caputo
*Assistant Examiner* — Nasir U Ahmed
(74) *Attorney, Agent, or Firm* — McCormick Paulding & Huber LLP

(57) ABSTRACT

A sensing cable has a sensing fiber assembly, which includes a pair of sensing fibers joined by a turnaround section with a modal filter, at a terminating end of the sensing fibers. The sensing cable also includes an inner sleeve that surrounds the sensing fiber assembly and an armored casing that caps the terminating end of the inner sleeve. The sensing cable has a low profile and its components are each made of high temperature and hydrogen tolerant materials and are capable of prolonged operation at high temperatures, such as up to 300° C., in hydrogen environments over long lengths of fiber. A distributed thermal sensing (DTS) interrogator is connected to the sensing cable and performs DTS measuring according to protocols and algorithms that leverage the modal filter of the turnaround section to calculate temperature readings along the sensing fiber assembly.

20 Claims, 3 Drawing Sheets

(56) References Cited

U.S. PATENT DOCUMENTS

| | | |
|---|---|---|
| 7,218,820 B2 * | 5/2007 | Maida, Jr. .................... 385/100 |
| 7,302,128 B2 * | 11/2007 | Grossman et al. ............. 385/16 |
| 7,391,433 B2 * | 6/2008 | Pollack .......................... 348/85 |
| 7,400,803 B2 * | 7/2008 | Maida, Jr. .................... 385/100 |
| 2002/0114568 A1 * | 8/2002 | Judkins .......................... 385/34 |
| 2004/0156588 A1 * | 8/2004 | Demidov et al. ............... 385/37 |
| 2006/0115204 A1 * | 6/2006 | Marsh et al. .................... 385/12 |
| 2006/0239330 A1 * | 10/2006 | Yamate et al. ................ 374/161 |
| 2006/0269211 A1 * | 11/2006 | Patel et al. .................... 385/138 |
| 2007/0229816 A1 * | 10/2007 | Chen et al. .................... 356/301 |
| 2008/0273852 A1 * | 11/2008 | Parker et al. .................. 385/128 |
| 2010/0140373 A1 * | 6/2010 | Myhre et al. .................... 239/71 |

* cited by examiner

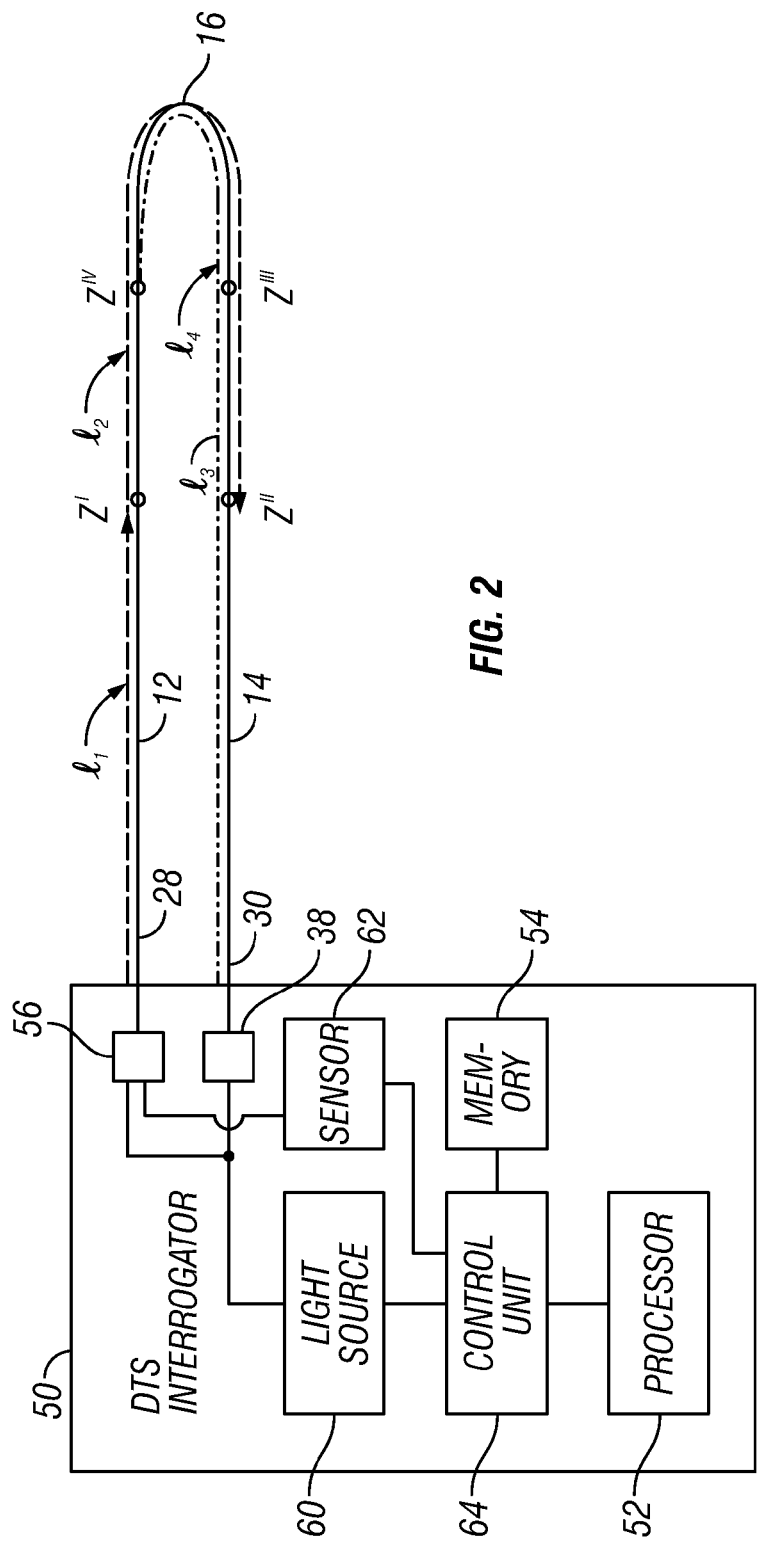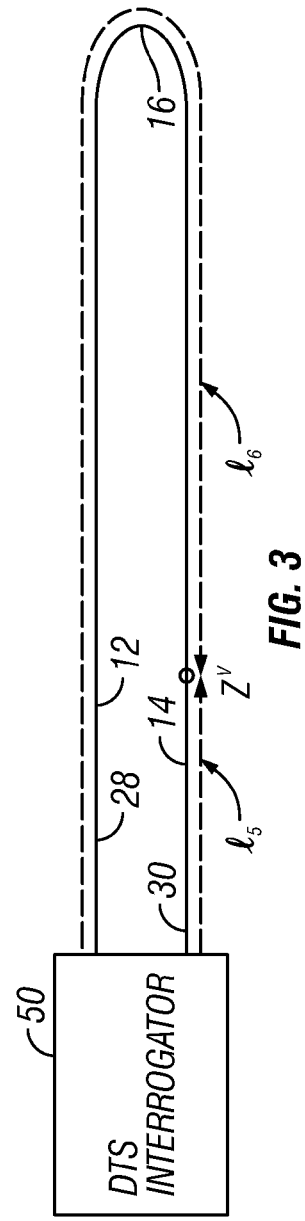

LOW PROFILE, HIGH TEMPERATURE, HYDROGEN TOLERANT OPTICAL SENSING CABLE

CROSS REFERENCE TO RELATED PATENT DOCUMENTS

This application claims the benefit of U.S. Provisional Application No. 61/373,442, filed Aug. 13, 2010, entitled "LOW PROFILE, HIGH TEMPERATURE, HYDROGEN TOLERANT OPTICAL SENSING CABLE", the aforementioned application being hereby incorporated by reference in its entirety. The present application incorporates the following patent documents by reference: U.S. Patent Application Ser. No. 61/373,349 to MacDougall et al., entitled "HIGH TEMPERATURE FIBER OPTIC TURNAROUND"; U.S. Patent Application Ser. No. 61/373,364 to MacDougall et al., entitled "METHOD FOR PERFORMING OPTICAL DISTRIBUTED TEMPERATURE SENSING (DTS) MEASUREMENTS IN HYDROGEN ENVIRONMENTS"; and U.S. Patent Application Ser. No. 61/373,394 to MacDougall et al., entitled "PASSIVATION OF OPTICAL SENSING FIBERS".

FIELD OF THE INVENTION

The present invention generally relates to a fiber optic sensing cable system and, more specifically, to a low profile, high temperature and hydrogen tolerant sensing cable assembly and distributed temperature sensing (DTS) interrogator for use with the same.

BACKGROUND OF THE INVENTION

Raman type distributed thermal sensing (DTS) instruments have been in the commercial stream over 30-years. These systems are based on Raman scatter effects of high intensity light launched into an optical sensing fiber, in which, due to the interaction between light and glass of the fiber, part of the light energy transmitted in the optical sensing fiber is transferred. Subsequent loss of energy resulting from the transfer increases the wavelength of light (i.e., a Stokes-shift), while the transferred energy can be donated to excited state atoms to cause decreased wavelength (i.e., an Anti-Stokes shift). The amount of energy donated, and relative intensity of Anti-Stokes shifted light, is related to the amount of atoms in an excited state, which is a function of temperature. Such non-linear shifted light can be collected and guided by the fiber to be received and analyzed.

In Raman DTS systems, light pulses are launched into an optical sensing fiber, the return time and intensity of back-scattered signals are recorded and, based on the recorded time and intensity, the temperature at specific locations all along the fiber is calculated. The resultant calculation yields a fully distributed temperature sensor.

Conventional Raman DTS instruments measure slight changes in the ratio of Stokes/Anti-Stokes intensity, which are separated in wavelength approximately 100 nm apart in typical near-infrared systems. Prior to installation, the sensing fiber or cable must be calibrated for each individual sensing fiber as this coefficient, and intrinsic optical attenuation at these wavelengths will vary among different sensing fibers. Once installed, successful operation of these sensors requires isolating the fiber from hydrogen, as even small amounts of hydrogen diffused into a sensing fiber creates measurement error in which wavelength-dependent hydrogen absorption creates differential fiber attenuation (DFA) between that of the intrinsic calibrated fiber and the fiber under hydrogenated condition, and furthermore will affect the Stokes/Anti-Stokes lines differently as the wavelength separation between them is significant.

To address this problem, DTS suppliers have developed compensation methods through dual- or partial-return downhole sensing configurations and measurement protocols, which are now commonly offered as a standard feature in most DTS interrogator instruments. In a dual-ended or partial return sensing configuration, the fiber is installed into the well with fiber in a turnaround loop or sub at the end of the well, where the fiber returns all the way or partially back to the surface, respectively. With these sensing configurations, it is possible to re-calibrate DTS measurements to compensate for DFA by implementing a measurement protocol and compensation algorithm. This particular architecture has two variations, one where the sensing cable has access to both ends at the surface, and the other where the sensing cable has a "turn-around" at the bottom, and the cable travels only a portion of the way back up the well. The strategy in both cases relies on the fact that two positions of the cable (separated by a distance L) are exposed to an identical temperature. If the cable length between the two sensing points experiences a differential loss due to hydrogen diffusion into the glass or possibly from mechanical bending, there will be a temperature difference between the two points. This temperature difference is then used to compensate the particular length of fiber between the two points and correct for the temperature difference. This process is applied over the entire length of the fiber section that has overlapping temperature points and a complete picture is then stitched together to correct the measured temperature along the entire section of cable that has co-located points. The fully dual-ended system, where the cable is interrogated from each end, has the ability to compensate the entire cable from top to bottom.

While fully dual-ended methods are practiced with some success, they are difficult to implement with current well instrumentation installation procedures and equipment. Dual-ended methods also have shortcomings in reliability and performance during well operations. These challenges begin when routing or looping the fiber at the distal end, during which time the fiber, and, in particular, the turnaround loop, must be retained in a low strain condition in order to maintain mechanical reliability of the fiber. The fiber must be further retained in a low stress condition along the length of the fibers during heating and thermal cycling, such as during well operations.

Downhole cables require metal armor or tubing construction to protect the fiber and resist the well chemical and pressure environment. Conventional downhole cables typically have thick-wall ¼" construction similar to hydraulic control lines. Unlike the latter that are hollow and transport fluid, fiber optic sensor cables house glass optical fibers that have a thermal expansion mismatch to the steel cable material, promoting significant stress on the fibers when the cable expands more dramatically upon heating. Use of excess fiber length cable design, in which a few percent-longer length of fiber is incorporated in the cable is common with downhole optical sensing cables to address this problem, using thick cable gels to retain the fiber within the cable. However, cable gels are especially difficult to impart uniformly on a fiber installed in a cable. Further, this issue is exacerbated with high temperature cables that use polyimide fiber coatings, with more difficult mechanical handling and subsequent fiber retention properties, and cannot use cable gels due to the limited upper temperature range of the cable gels. Furthermore, fiber loop and turnaround hardware, and fiber splice packaging to connect such hardware, is much larger than the cable diameter, presenting an obstruction and frequently a point of failure. Fiber turnaround devices with a small form factor relative to the cable are available based on fused-taper fiber construction, but are limited to lower temperature packaging (i.e., less than 125° C.).

Despite these difficulties, dual and partial-ended Raman DTS systems are routinely installed with spliced turnaround or looped fluid conveyance methods or other arrangements. These systems are subsequently operated using special measurement protocols and compensation algorithms that typically perform a slope correction calculated from a co-located position above the turnaround point for each fiber. While this solution presents a significant improvement in DFA errors, it is averaged, and does not account for non-uniform distribution of DFA and sources such as modal loss that is dynamic. This results in measurement error along discrete points of the sensing cable.

The object of the present invention is, therefore, to provide a cable for an optical sensing fiber, which, among other desirable attributes, significantly reduces or overcomes the above-mentioned deficiencies of prior cables.

SUMMARY OF THE INVENTION

Accordingly, in an aspect of the present invention, a cable for an optical sensing fiber is provided that incorporates hydrogen-tolerant sensing fibers in a low profile, low strain, dual-fiber armored cable configuration. This integrated high temperature downhole DTS sensing cable assembly allow use of dual-ended DTS measurement protocols and compensation algorithms, in a single integrated package.

In an aspect of the present invention, a high temperature downhole DTS sensing cable assembly is provided that includes a pair of hydrogen-tolerant sensing fibers are connected at a terminating end by an annealed metal-coated turnaround section.

In an aspect of the present invention, a high temperature downhole DTS sensing cable assembly is provided that integrates a compact guided wave turnaround device into the cable.

In an aspect of the present invention, a high temperature downhole DTS sensing cable assembly is provided that integrates a modal filter into the compact guided wave turnaround device of the cable.

It is an object of the present invention to provide an integrated high temperature downhole DTS sensing cable assembly that presents a low profile package, is amenable to well installation and does not obstruct well operations for improved reliability.

In an aspect of the present invention, a cable assembly is provided that presents a single sensing cable element with dual-fiber, dual-return sensing architecture for DTS measuring and DFA compensation.

In an aspect of the present invention, a cable is interrogated using conventional Raman DTS instrumentation and the interrogated signals are processed to compensate for non-linear or non-uniform DFA distribution.

In an aspect of the present invention, a cable is interrogated and the interrogated signals are processed to compensate for dynamic DFA due to modal effects based, in part, on the effect of the modal filter incorporated in the guided wave turnaround device.

It is an object of the present invention to provide a sensing cable assembly that is made of high temperature and hydrogen resistant materials that tolerates temperatures up to 300° C. in hydrogen environments.

These and other features of the present invention are described with reference to the drawings of preferred embodiments of an optical sensing cable assembly.

BRIEF DESCRIPTION OF THE DRAWINGS

The illustrated embodiments of a sensing cable assembly of the present invention are intended to illustrate, but not limit, the invention.

FIG. 2 illustrates a distributed temperature sensing (DTS) system performing to a method of DTS measuring according to an embodiment of the present invention.

FIG. 3 illustrates the DTS system of FIG. 2 performing a method of full turn around or full loop architecture DTS measuring according to an embodiment of the present invention.

DETAILED DESCRIPTION OF THE PREFERRED EMBODIMENTS

Figure 1:
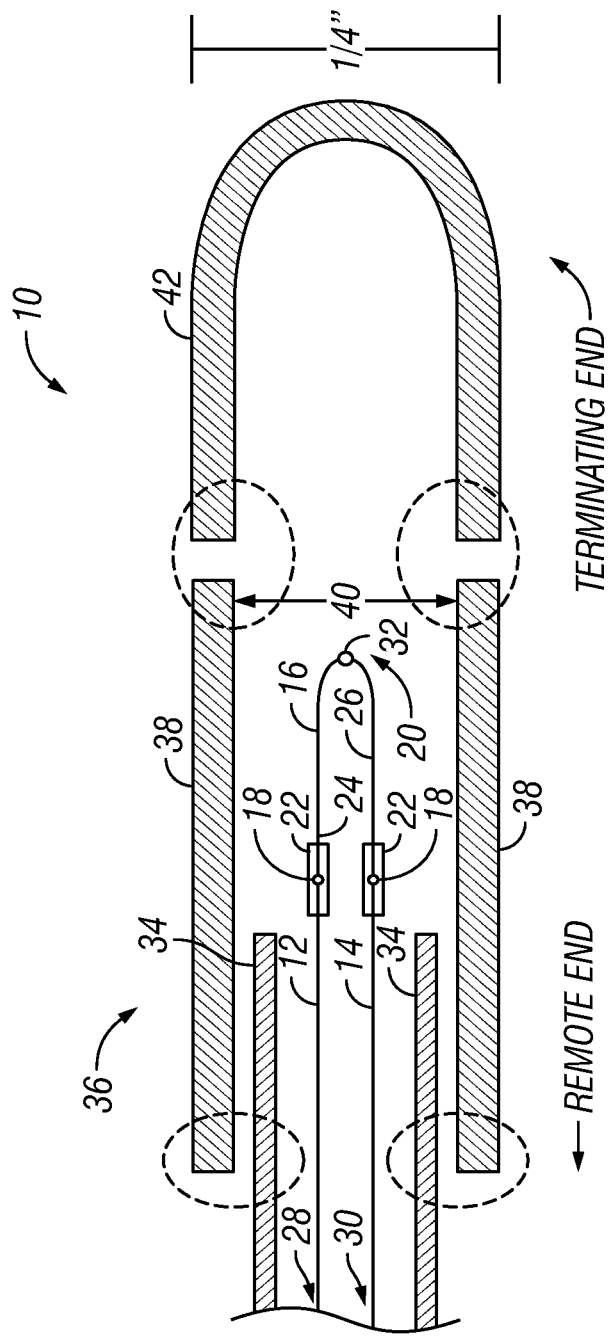
FIG. 1 illustrates a schematic of a cross section of a sensing cable including a sensing fiber assembly, an inner sleeve and an elongated armor casing according to one embodiment of the present invention.

Referring to FIG. 1, a cross section of an integrated high temperature downhole DTS sensing cable assembly (hereinafter referred to as "sensing cable 10") is shown. The sensing cable 10 has a sensing fiber assembly, which includes sensing fibers 12, 14 connected to a turnaround section 16 via fusion splices at splice junctions 18, 18.

The turnaround section 16 includes a bend 20 that has a small-radius (e.g., having a radius of, as small as, 0.005 inches, but preferably 0.0075 inches), is U-shaped and forms an angle of substantially 180°. Preferably, the bend 20 is substantially elliptically shaped. The splice junctions 18, 18 are sealed by a pair of high temperature splice protectors 22, 22 that are heat-shrunk about terminating ends of the sensing fibers 12, 14 and ends 24, 26 of the turnaround section 16. The turnaround section 16 includes a modal filter 32 that selectively blocks, attenuates or enables bands or spectrums of light to pass through the turnaround section 16. As a result, the modal filter 32 only allows finite bands to be passed through the turnaround section 16 and received at the opposing end 28, 30 of the sensing fibers 12, 14, respectively. For example, the modal filter 32 can be selected to only allow bands associated with targeted types of error (i.e., non-temperature induced error) to pass through the modal filter 16. Alternatively, the modal filter 16 can be used to functionally divide the sensing fiber assembly into halves that correspond to each of the sensing fibers 12, 14, separately.

An inner sleeve 34, such as a metal tube, is mounted to the sensing fibers 12, 14 and positioned along the length of the sensing fibers 12, 14, ending slightly away from the splice junctions 18, 18. The inner sleeve 34 runs along the length of the sensing fibers 12, 14.

An elongated outer casing 36 is attached to the inner sleeve 34 toward the terminating end of the sensing fibers 12, 14. The casing 36 includes an outer armor tube 38 (e.g., a cylindrical tube having a diameter between 0.10 inch and 0.50 inches, but preferably 0.25 inches) that is affixed to the inner sleeve 34 toward the remote end thereof. Preferably, the armor tube 38 is welded to the inner sleeve 34.

The terminating end of the armor tube 38 defines an opening 40 that is positioned to extend beyond the tip of the bend 20 (i.e., away from the sensing fibers 12, 14). The casing 36 also includes a sealing cap 42 that is affixed to the armor tube 38 to form a rugged barrier around the sensing fibers 12, 14 and the turnaround section 16. Preferably, the sealing cap 42 is welded to the armor tube 38.

The sensing cable 10, which includes the inner sleeve 34 and the casing 36, is compact in size and characterized by a low profile. The sizing and shaping of the sensing cable 10 facilitates insertion of the sensing cable 10 into downhole environments.

The components of the sensing cable 10 are made of high temperature materials. For instance, the glass of the sensing fibers 12, 14 is made of pure silica. The inner sleeve 34, the armor tube 38 and the sealing cap 42 are each made of stainless steal. In addition, the coatings on the sensing fibers 12, 14 and the high temperature splice protectors 22, 22, are made of high temperature polymer, such as polyimide and acrylate. The coating of the turnaround section 16, at least after the annealing process, is metallic and robust.

Preferably, the turnaround section 16 is treated with an annealing process to reduce stress induced in the glass during the bending process of the turnaround section 16. An exemplary annealing process is described in U.S. Application Ser. No. 61/373,349, which is incorporated herein by reference. In particular, the turnaround section 16 is made of an optical fiber having a jacket that includes a metallic component, such as gold, silver or copper. The turnaround section 16 is bent and, then, annealed at temperatures of 700° C. and above. Specifically, the bent optical fiber is slowly heated, annealed at the peak temperature and, then, slowly cooled for periods of, for instance, twelve-hours each. As a result of the annealing process, the turnaround section 16 is rendered mechanically and chemically robust.

Preferably, the sensing fibers 12, 14 are treated with a passivation treatment. An exemplary passivation treatment is described in U.S. Application Ser. No. 61/373,394, which is incorporated herein by reference. In particular, the passivation treatment, which is performed in a sealed kiln, includes several long-duration, high temperature bake cycles in different mixtures of gas. For instance, the bake cycles include: (1) 24 to 36 hours at between 200 and 350° C. in an inert gas, such as nitrogen, carbon dioxide, helium and argon; (2) 24 to 36 hours at between 200 and 350° C. in a first deuterium gas mix, such as a mixture of deuterium, nitrogen and hydrogen; (3) 24 to 36 hours at between 200 and 350° C. in a second deuterium gas mix, such as a mixture of deuterium, nitrogen and hydrogen; and (4) 24 to 36 hours at between 200 and 350° C. in an inert gas, such as nitrogen, carbon dioxide, helium and argon. As a result of the passivation treatment, the attenuation characteristics of the sensing fibers 12, 14 and the turnaround section 16 are lowered, particularly in the sensing band, for improved attenuation characteristics in the 600-1400 nm band. In addition, as a result of the passivation treatment, the coatings of the sensing fibers 12, 14 are rendered smooth. This smoothness of the sensing fibers 12, 14 facilitates insertion of the sensing fibers 12, 14 into the inner sleeve 34 and the casing 36 without the use of gels. In addition, this smoothness of the sensing fibers 12, 14 reduces the stress on the sensing fibers 12, 14 caused when the sensing cable 10 is bent Once the sealed sensing cable 10 is assembled, the sensing cable 10 can be used for communication and downhole sensing. For instance, in distributed temperature sensing (DTS) of oil wells, the terminating end of the sensing cable 10 (i.e., the tip with the sealing cap 42 affixed thereto) is fed into an oil well. The remote end of the sensing cable 10, which includes exposed ends 28, 30 of the sensing fibers 12, 14 and is retained outside of the oil well, has an optical sensing device attached thereto.

The exposed ends 28, 30 of the sensing fibers 12, 14 are fitted with a coupled pair of connectors. The connectors are square shaped plugs that correspond to a square-shaped port of the optical sensing device.

Referring to FIGS. 2-3, the optical sensing device, such as a DTS interrogator 50 that includes a processor 52 and memory 54, is shown attached to and in communication with the sensing cable 10. The DTS interrogator 50, which has a separate channel 56, 58 for each sensing fiber 12, 14, transmits light signals from a light source 60 down the length of one or both sensing fibers 12, 14 and measures using a sensor 62 the received light at one or more of the sensing fibers 12, 14. Based on the measured light, the DTS interrogator 50 determines a temperature difference between various points along the sensing fibers 12, 14 using a method of DTS measuring or interrogation that is performed on a control unit 64. The control unit 64 is electronically connected to the processor 52, the memory 54, the light source 60 and the sensor 62. For example, the temperature difference can be measured for co-located points (e.g., $Z^I(l_1)$ and $Z^{II}(l_1+l_2)$; $Z^{III}(l_3)$ and $Z^{IV}(l_3+l_4)$) from each end 28, 30 of the sensing fibers 12, 14, separately (FIG. 2) or for a single point (e.g., $Z^V(l_5, l_5+l_6)$) from both ends 28, 30 of the sensing fibers 12, 14 (FIG. 3). Based on the measured temperature difference, the DTS interrogator 50 determines an error induced by a differential loss mechanism, such as hydrogen absorption in the sensing fibers 12, 14. Then, based on the determined error, the DTS interrogator 50 calculates a corrected temperature reading for each point along the sensing fibers 12, 14.

Preferably, the DTS interrogator 50 uses the method for performing DTS measuring and DFA compensation described in U.S. Application Ser. No. 61/373,364, which is incorporated herein by reference. However, other methods for performing DTS measuring may also be utilized (see, e.g., FIG. 3 (showing a full-loop architecture DTS measuring method)).

In addition, the operating protocols and algorithms of the DTS interrogator 50 take into account the effect of the modal filter 32 that is integrated in the turnaround section 16.

Figure 4:
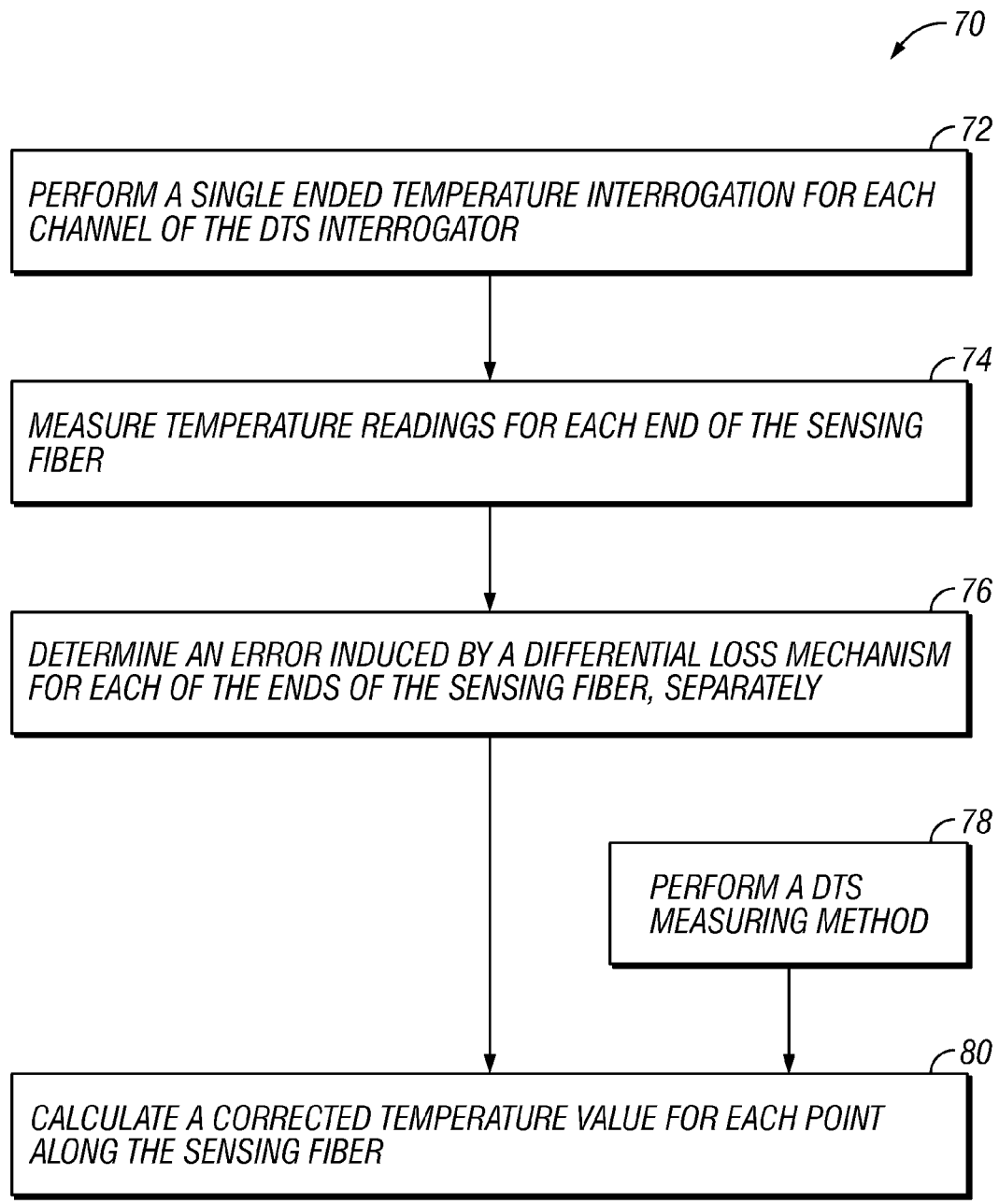
FIG. 4 illustrates a method of performing DTS measuring for a sensing fiber that includes a modal filter in a turnaround section thereof according to an embodiment of the present invention.

Referring to FIG. 4, a method for performing optical distributed temperature sensing measurements for an optical fiber that includes a modal filter, such as the sensing fiber assembly with modal filter 32, is shown at 70.

According to the method 70, the DTS interrogator 50 performs (box 72) a single ended temperature interrogation for each channel 56, 58 of the DTS interrogator 50. For instance, a light signal is transmitted down each end 28, 30 of the sensing fiber 12, 14, separately.

The sensor 62 of the DTS interrogator 50 measures (box 74) temperature readings for each end 28, 30 of the sensing fibers 12, 14. Since the modal filter 32 functionally divides the sensing fiber assembly into two halves that correspond to each of the sensing fibers 12, 14, the measured temperature readings are indicative of loss along only one of the sensing fibers 12, 14, respectively. The raw temperature data is stored in memory 54. The modal filter 32 also enables dynamic loss to be measured.

The processor 52 of the DTS interrogator 50 determines (box 76) an error induced by a differential loss mechanism for each of the sensing fibers 12, 14, separately, and for dynamic differential loss.

The processor 52 of the DTS interrogator 50, then, in conjunction with performing (box 78) a DTS measuring method, as discussed above, calculates (box 80) a corrected temperature value for each point along the sensing fibers 12, 14. The calculation of the corrected temperature value is based on the measured raw temperature data, the determined error for each of the sensing fibers 12, 14, separately, and the determined error for dynamic differential loss, which are each impacted by the presence of the modal filter 32.

The DTS interrogator 50 achieves improved results that account for non-uniformly distributed differential loss and is capable of generating accurate temperature readings along the entire length of both of the sensing fibers 12, 14 and the turnaround section 16.

It should be understood that the foregoing description is only illustrative of the invention. Various alternatives and modifications can be devised by those skilled in the art without departing from the broader aspects of the present invention.

What is claimed is:

1. An optical sensing cable comprising:
    a fiber assembly having a pair of sensing fibers, each of the pair of sensing fiber defining a terminating end and a remote end, the terminating ends being joined together by a turnaround section, the turnaround section having a modal filter, the modal filter allowing finite bands of light to pass therethrough;
    an inner sleeve surrounding a portion of the sensing fiber assembly;
    and an armored casing encapsulating a terminating end of the inner sleeve and housing the turnaround section, the armored casing having an outer diameter of less than about 0.5 inches.

2. The optical sensing cable according to claim 1, wherein the fiber assembly, the inner sleeve, and the armored casing are each made of a high temperature and hydrogen tolerant material to allow prolonged operation at high temperatures in hydrogen environments.

3. The optical sensing cable according to claim 1, wherein each of the pair of sensing fibers is joined to the turnaround section by a splice junction.

4. The optical sensing cable according to claim 3, wherein each splice junction is sealed by a high temperature splice protector that is heat shrunk about the terminating end of the pair of sensing fibers and adjoining ends of the turnaround section.

5. The optical sensing cable according to claim 4, further comprising a coating of high temperature polymer along the sensing fibers and the high temperature splice protectors.

6. The optical sensing cable according to claim 1, wherein the turnaround section having a bend, the bend forming an angle of substantially 180° within a diameter of less than about 0.25 inch.

7. The optical sensing cable according to claim 6, wherein the turnaround section being treated with an annealing process to reduce stress induced during formation of the bend of the turnaround section.

8. The optical sensing cable according to claim 6, wherein each of the pair of sensing fibers is constructed of substantially pure silica.

9. The optical sensing cable according to claim 1, wherein the modal filter is configured to functionally divide the fiber assembly into halves that separately correspond to each of the sensing fibers.

10. The optical sensing cable according to claim 1, wherein the inner sleeve is constructed from a metal material being formed in the shape of a tube.

11. The optical sensing cable according to claim 1, further comprising a metallic coating along the turnaround section.

12. The optical sensing cable according to claim 1, further comprising a pair of connectors fitted to the remote ends of each of the pair of sensing fiber.

13. The optical sensing cable according to claim 1, wherein the sensing fibers being treated with a passivation treatment to lower attenuation characteristics of the sensing fibers.

14. A sensing assembly comprising:
    an optical sensing cable having:
        a fiber assembly having a pair of sensing fibers joined by a turnaround section;
        a modal filter being located along the turnaround section, the modal filter allowing finite bands of light to pass therethrough;
        an inner sleeve surrounding a portion of the fiber assembly; and
        an armored casing encapsulating a terminating end of the inner sleeve and housing the turnaround section, the armored casing having an outer diameter of less than about 0.5 inches; and
    an optical sensing device being in communication with each of the pair of sensing fibers of the optical sensing cable, the optical sensing device having:
        a separate channel for each of the pair of sensing fibers;
        a light source connected with at least one of the pair of sensing fibers to transmit a light signal down the length of the at least one of the pair of sensing fiber;
        a sensor connected with at least one of the pair of sensing fibers to measure the light signal transmitted down the length of the at least one of the pair of sensing fiber; and
        a control unit electronically connected with the sensor, the control unit being configured to determine a temperature difference between at least one of the fibers or the channels at various points along the pair of sensing fibers based on the measured light signal.

15. The sensing assembly according to claim 14, wherein the fiber assembly, the inner sleeve, and the armored casing are each made of a high temperature and hydrogen tolerant material to allow prolonged operation at high temperatures in hydrogen environments.

16. The sensing assembly according to claim 14, wherein the modal filter functionally dividing the fiber assembly into halves that separately correspond to each of the pair of sensing fibers.

17. A method for performing optical distributed temperature sensing measurements for an optical fiber, the method comprising the steps of:
    providing an optical sensing cable having:
        a fiber assembly having a pair of sensing fibers joined by a turnaround section;
        a modal filter being located along the turnaround section, the modal filter allowing finite bands of light to pass therethrough;
        an inner sleeve surrounding a portion of the fiber assembly; and
        an armored casing encapsulating a terminating end of the inner sleeve and housing the turnaround section, the armored casing having an outer diameter of less than about 0.5 inches;
    providing an optical sensing device being in communication with each of the pair of sensing fibers of the optical sensing cable, the optical sensing device having:
        a separate channel for each of the pair of sensing fibers;

a light source connected with at least one of the pair of sensing fibers to transmit a light signal down the length of the at least one of the pair of sensing fiber;

a sensor connected with at least one of the pair of sensing fibers to measure the light signal transmitted down the length of the at least one sensing fiber; and a control unit electronically connected with the sensor;

transmitting the light signal from the light source down each of the pair of sensing fibers;

performing a single ended temperature interrogation for each channel to determine a temperature difference between at least one of the fibers or the channels at various points along the sensing fibers based on the measured light signal.

18. The method for performing optical distributed temperature sensing measurements for an optical fiber according to claim 17, wherein the optical sensing device is a DTS interrogator.

19. The method for performing optical distributed temperature sensing measurements for an optical fiber according to claim 17, further comprising the step of determining an error induced by a differential loss mechanism for each of the pair of sensing fibers for separate and dynamic differential loss.

20. The method for performing optical distributed temperature sensing measurements for an optical fiber according to claim 17, further comprising the step of calculating a correct temperature value for each point along the pair of sensing fibers based on temperature data, the determined error for each of the pair of sensing fibers, and the determined error for the dynamic differential loss.

* * * * *